(12) United States Patent
Wu

(10) Patent No.: US 9,542,111 B2
(45) Date of Patent: *Jan. 10, 2017

(54) WRITABLE CLONE DATA STRUCTURE

(71) Applicant: Skyera, LLC, San Jose, CA (US)

(72) Inventor: Qi Wu, San Jose, CA (US)

(73) Assignee: Skyera, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,260

(22) Filed: Feb. 1, 2016

(65) Prior Publication Data

US 2016/0147474 A1    May 26, 2016

Related U.S. Application Data

(63) Continuation of application No. 14/066,349, filed on Oct. 29, 2013, now Pat. No. 9,250,828.

(51) Int. Cl.
*G06F 12/00*  (2006.01)
*G06F 3/06*  (2006.01)
*G06F 11/14*  (2006.01)

(52) U.S. Cl.
CPC .............. *G06F 3/0619* (2013.01); *G06F 3/061* (2013.01); *G06F 3/065* (2013.01); *G06F 3/067* (2013.01); *G06F 3/068* (2013.01); *G06F 3/0608* (2013.01); *G06F 3/0625* (2013.01); *G06F 3/0638* (2013.01); *G06F 3/0641* (2013.01); *G06F 3/0643* (2013.01); *G06F 3/0665* (2013.01); *G06F 3/0673* (2013.01); *G06F 3/0683* (2013.01); *G06F 11/1446* (2013.01); *G06F 11/1448* (2013.01); *G06F 2003/0698* (2013.01); *Y02B 60/1246* (2013.01)

(58) Field of Classification Search
CPC ............................ G06F 3/0638–3/0643; G06F 11/1446–11/1453
USPC ........................................................ 711/162
See application file for complete search history.

(56) References Cited

U.S. PATENT DOCUMENTS

| | | |
|---|---|---|
| 7,334,095 B1 | 2/2008 | Fair et al. |
| 7,757,056 B1 | 7/2010 | Fair |
| 8,423,733 B1 | 4/2013 | Ozdemir |
| 2005/0246397 A1 | 11/2005 | Edwards et al. |
| 2005/0246503 A1 | 11/2005 | Fair |
| 2012/0030439 A1 | 2/2012 | Engelsiepen et al. |
| 2013/0066930 A1* | 3/2013 | Kamei ................. G06F 3/061 707/823 |

* cited by examiner

*Primary Examiner* — Prasith Thammavong
(74) *Attorney, Agent, or Firm* — Wilmer Cutler Pickering Hale and Dorr LLP

(57) ABSTRACT

A memory system including parent data and clone data is disclosed, where the clone data represents a clone of the parent data. The system determines whether clone data to be accessed is different from corresponding data in the parent. The system also determines a physical location of the data to be accessed based on whether the data to be accessed is different from the corresponding parent data. The system also accesses the data based on the physical location.

21 Claims, 12 Drawing Sheets

WRITABLE CLONE DATA STRUCTURE

CROSS-REFERENCE TO RELATED APPLICATIONS

This application is a continuation of and claims the benefit under 35 U.S.C. §120 of U.S. patent application Ser. No. 14/066,349, filed on Oct. 29, 2013, now U.S. Pat. No. 9,250,828, entitled "Writable Clone Data Structure," the contents of which are hereby incorporated by reference in their entirety.

FIELD OF THE INVENTION

The present invention relates, generally, to storage devices and, more particularly, to systems and methods for generating and using memory data clones.

BACKGROUND OF THE INVENTION

When displayed for a user of a computer system, data representing a file or other collection of related information is presented with an organization which is easily understood by the user. For example, a text file is presented such that the user can read the text. However, the data in the memory representing the text file has a different organization. In order to optimize memory usage, the data representing the text file is fragmented such that a single text file may be represented by many data fragments, where the data fragments may be dispersed throughout the memory. Accordingly, each data fragment has a physical memory address, representing the physical location of the fragment. In addition, each fragment has a logical memory address, representing the logical position of the data fragment within the file. When data is accessed, the physical memory address may be determined based on the logical address using metadata, which includes a mapping tree. Accordingly, for each file or related group of files there are two sets of data. The first set being the data representing the file, and the second set representing metadata which includes the mapping tree and which is used to preserve the logical order of the data fragments.

In some cases, each file or related group of files may be large and therefore require large amounts of memory space. If a copy of such a file is desired, a duplicate of both sets of data may be generated. If the file to be copied is large, generating a duplicate by copying both sets of data is time consuming and requires large amounts of memory.

To address this problem, clones are sometimes used. In general, a clone is similar to a copy, in that it may be edited and used like a copy. A clone, however, may not have a duplicate of the first set of data, representing the information in the file. When a clone is generated, the data representing the file of the clone and the parent are identical. Therefore, to avoid redundant data within the memory, the first set of data need not be duplicated. The clone has a duplicate only of the second set of data, or metadata. The metadata of the clone, points to the first set of data of the parent. As the clone is edited, data representing the modified clone is generated, and the metadata of the clone is modified so as to point to both the first set of data and to the generated data of the modified clone. As a result, the metadata of the clone is modified such that portions of the metadata corresponding with modified portions of the clone point to the generated data of the modified clone, and portions of the metadata corresponding with unmodified portions of the clone point to the first set of data of the parent. Accordingly, using a clone eliminates the need to duplicate the first set of data. Therefore, redundant data is avoided, and significant time and memory storage is saved.

Clones are particularly useful in data backup and protection systems. Such systems often require large amounts of memory and efficient an optimal use of the memory results in numerous benefits to the systems. Clones allow for the efficient an optimal memory utilization resulting in low cost, low power usage, high speed, and good reliability.

Such clones, however, generate redundant metadata by copying the second set of data of the parent. Accordingly, such clones waste significant time and memory storage.

SUMMARY OF THE INVENTION

One inventive aspect is a memory system. The memory system includes a memory controller, and a memory. The memory is configured to store a plurality of data fragments at a plurality of first physical addresses of the memory, where each data fragment has a logical address. The memory is further configured to store mapping tree data, where the mapping tree data includes the first physical addresses. The first physical addresses are stored at second physical addresses of the memory, and the second physical addresses may be determined based in part on the logical addresses of the data fragments. A first portion of the mapping tree is associated with a first logically associated set of data fragments stored in the memory, and a second portion of the mapping tree is associated with a second logically associated set of data fragments stored in the memory. The second set of data fragments is a clone of the first set of data fragments, and the first set of data fragments is a parent of the clone. The second portion of the mapping tree includes one or more change indicators, each indicating that a particular data fragment of the clone associated with a particular logical address is different from a data fragment of the parent associated with the particular logical address.

Another inventive aspect is a method of accessing data in a memory. The memory is configured to store a plurality of data fragments at a plurality of first physical addresses of the memory, and each data fragment has a logical address. The memory is further configured to store mapping tree data, where the mapping tree data includes the first physical addresses. The first physical addresses are stored at second physical addresses of the memory, and the second physical addresses may be determined based in part on the logical addresses of the data fragments. A first portion of the mapping tree is associated with a first logically associated set of data fragments stored in the memory, and a second portion of the mapping tree is associated with a second logically associated set of data fragments stored in the memory, where the second set of data fragments is a clone of the first set of data fragments, and the first set of data fragments is a parent of the clone. The second portion of the mapping tree includes one or more change indicators, each indicating that a particular data fragment of the clone associated with a particular logical address is different from a data fragment of the parent associated with the particular logical address. In addition, the data to be accessed is a member of the second set of data fragments and is associated with a particular logical address. The method includes determining whether the data to be accessed is different from a data fragment of the parent associated with the particular logical address based on an indicator associated with the data to be accessed. The method also includes determining a physical location of the data to be accessed based on whether the data to be accessed is different from a corresponding data fragment of the parent associated with the particular logical address. The method also includes accessing the data to be accessed based on the physical location.

Another inventive aspect is a method of changing data of a clone in a memory. The memory is configured to store a plurality of data fragments at a plurality of first physical addresses of the memory, where each data fragment has a logical address. In addition, the memory is further configured to store mapping tree data, where the mapping tree data includes the first physical addresses. The first physical addresses are stored at second physical addresses of the memory, and the second physical addresses may be determined based in part on the logical addresses of the data fragments. A first portion of the mapping tree is associated with a first logically associated set of data fragments stored in the memory, and a second portion of the mapping tree is associated with a second logically associated set of data fragments stored in the memory, where the second set of data fragments is a clone of the first set of data fragments, and the first set of data fragments is a parent of the clone. The second portion of the mapping tree includes a plurality of change indicators associated with a plurality of logical addresses, where the change indicators indicate whether the data fragment of the clone is different from corresponding data fragments of the parent. The data to be changed is a member of the second set of data fragments and is associated with a particular logical address. The method includes changing the data to be changed, and generating a change indicator associated with the particular logical address. The generated change indicator indicates that the data to be changed has been changed. In addition, the generated change indicator is associated with the particular logical address.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like parts.

Figure 1:
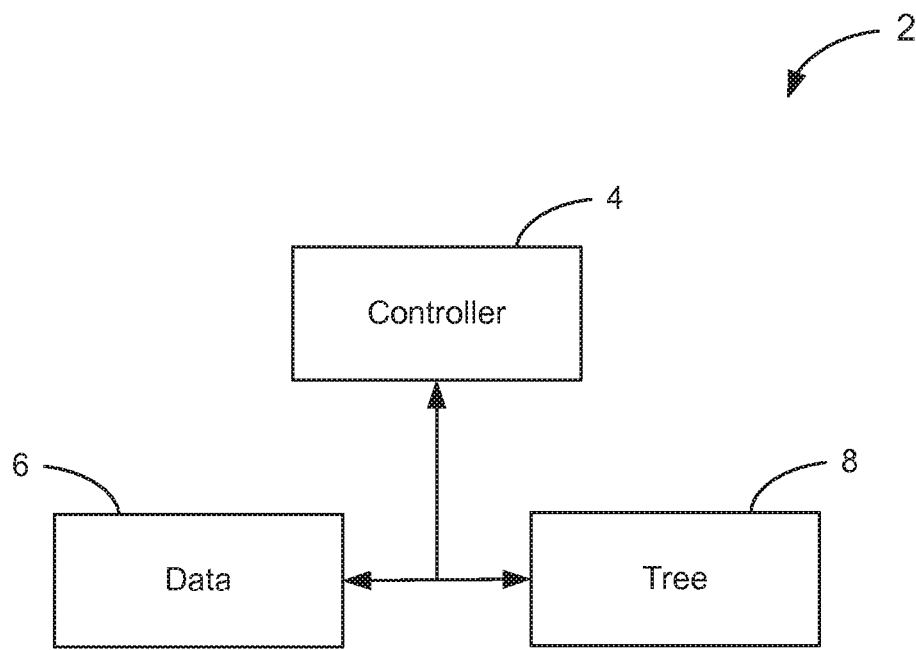
FIG. 1 is a schematic representation of an embodiment of a memory system.

FIG. 1 is a schematic representation of an embodiment of a memory system 2. In this embodiment, memory system includes controller 4, data memory 6, and mapping tree memory 8. While represented in FIG. 1 as separate memories, in some embodiments, data memory 6 and mapping tree memory 8 are physically integrated within the same memory device. In some embodiments, data memory 6 and mapping tree memory are physically separate.

Controller 4 is configured to interface with, for example, a processor of a computer. When the processor needs to access memory, instructions are provided to controller 4. The instructions include the type of access (e.g., a read or a write), and a memory address. The memory address represents a logical address, as used by the processor. The memory address is either a logical block address (LBA) used by the memory controller or is converted to an LBA by the memory controller.

In this embodiment, in order to accomplish the memory access associated with the instructions from the processor, the memory controller 4 accesses data memory 6, where data is stored at physical addresses. In order to determine the correct physical addresses, the controller 4 uses mapping tree memory 8, which provides controller 4 physical addresses based on LBAs. Accordingly, the controller 4 provides the mapping tree memory 8 with a request including an LBA, and in response to the request, the mapping tree memory 8 provides the controller 4 with a physical address associated with the LBA of the request.

Figure 2:
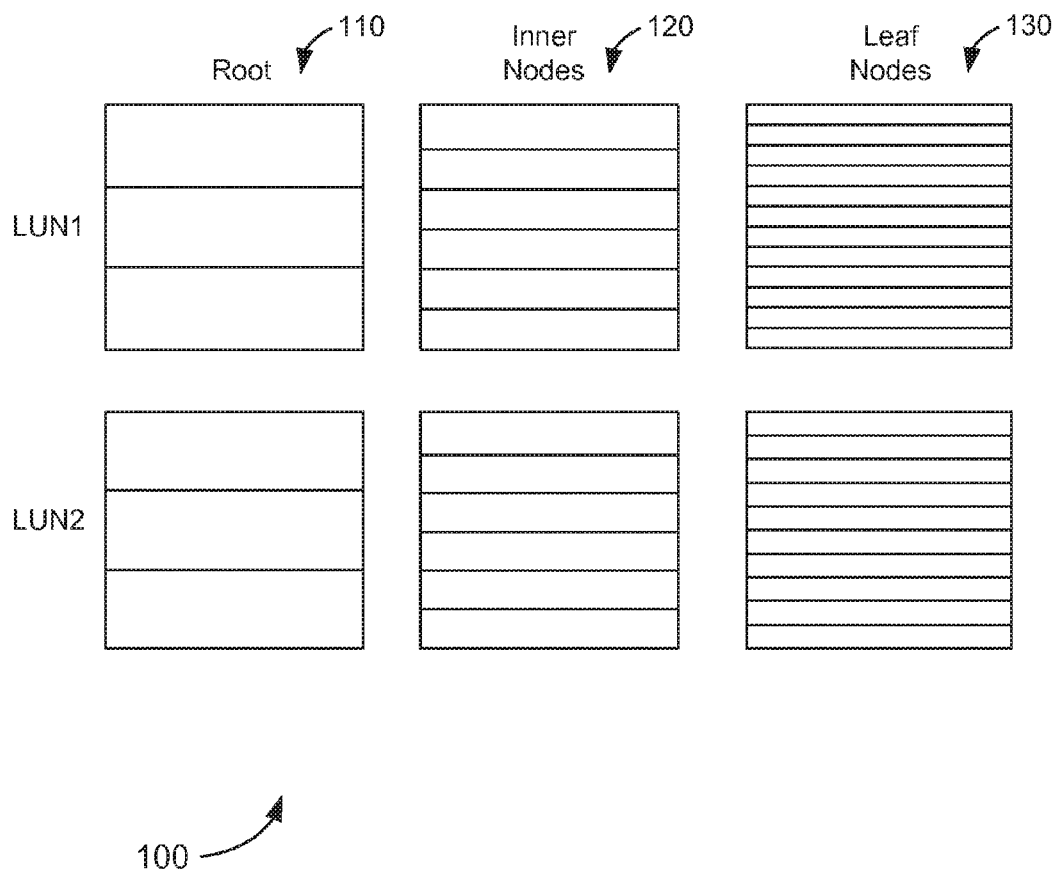
FIG. 2 is a schematic representation of an embodiment of a mapping tree.

FIG. 2 is a schematic representation of an embodiment of a mapping tree 100. Mapping tree 100 includes root 110, inner nodes 120, and leaf nodes 130. The root 110 includes multiple logic unit numbers (LUNs), where each LUN is associated with a file or other logically connected data set which is stored in the memory. Each LUN is associated with a plurality of inner nodes 120, and each inner node 20 is associated with one or more leaf nodes 130.

Among other possible information, each LUN includes a header and one or more pointers. Each of the pointers represents a location and identifies one of the inner nodes 120. The header of the LUN includes information which identifies one of the pointers based on the logical block address (LBA).

In this embodiment, each group of inner nodes 120 is associated with one of the LUNs, and each group of inner nodes 120 is associated with a group of leaf nodes 130. Among other possible information, each group of inner nodes 120 includes a header and one or more pointers. Each pointer represents a location and identifies one of the leaf nodes 130. The header includes information which identifies one of the pointers based on the LBA.

In this embodiment, each of the leaf nodes includes a header and one or more fragment identifiers. Each fragment identifier identifies a physical memory location for a data fragment of the file of the LUN associated with the leaf node. For example, among other possible information, each fragment identifier may include a physical address (PA) indicating a physical starting position in the memory for the data fragment and a length (L) of the data fragment.

With the hierarchical structure of the mapping tree, the memory system may store data associated with a file, and receive modifications to the stored data without rewriting all of the data as part of each modification. If, for example, new data is to be inserted within previously stored data, the new data may be stored in any available memory location. In order to preserve the logical organization of the new data being within the previously stored data, the mapping tree is appropriately updated.

For example, a new fragment identifier of a leaf node 130 may be generated for the new data. The new fragment identifier includes a physical address and a length of the new data. The new fragment identifier may be included in a previously existing leaf node 130, or may be included in a new leaf node 130. In addition, the inner nodes 120 and the LUN 110 may be updated such that the hierarchy of the LUN 110 and inner nodes 120 can be used to identify the new leaf node 130 given an LBA, which represents the logical location of the new data within the previously stored data.

Furthermore, if the new data is inserted within the file at a location which is in the middle of a previous data fragment, the leaf node 130 representing the previous data fragment may be modified in response to the insertion of the new data, for example, by changing its length attribute to represent the portion of the previous data fragment before the insertion point. In addition, a second new fragment identifier may be generated. The second new fragment identifier includes the physical address location and length attributes of the portion of the previous data fragment after the insertion point. In addition, the pointers and header information of the inner nodes 120 may be correspondingly updated.

Figure 3:
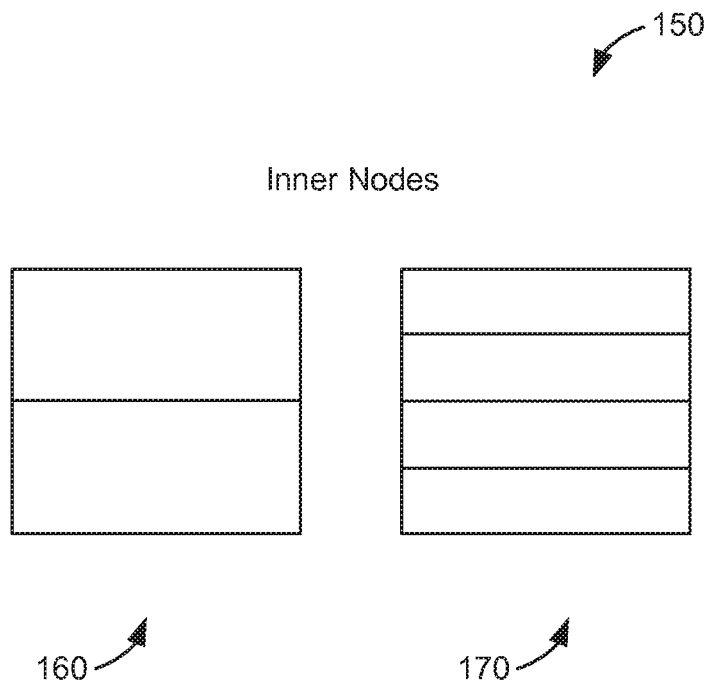
FIG. 3 is a schematic representation of an embodiment of a group of inner nodes which may be used in the mapping tree of FIG. 2.

FIG. 3 is a schematic representation of an embodiment of a group of inner nodes 150 which may be used in mapping tree 100 of FIG. 2. In this embodiment, the group of inner nodes 150 includes first inner nodes 160 and second inner nodes 170.

In this embodiment, each of the first inner nodes 160 is associated with one of the LUNs. In addition, each of the first inner nodes 160 is associated with a group of second inner nodes 170. Among other possible information, each group of first inner nodes 160 includes a header and one or more pointers. Each pointer represents a location and identifies one of the second inner nodes 170. The header includes information which identifies one of the pointers based on the LBA.

In this embodiment, each of the second inner nodes 170 is associated with one of the first inner nodes 160. In addition, each of the second inner nodes 170 is associated with a group of leaf nodes 130. Among other possible information, each group of second inner nodes 170 includes a header and one or more pointers. Each pointer represents a location and identifies one of the leaf nodes 130. The header includes information which identifies one of the pointers based on the LBA.

With additional inner nodes, the hierarchical architecture of the mapping tree may be managed to optimize the mapping tree and the memory system for various performance parameters, such as speed and power. Other performance parameters may be additionally or alternatively optimized.

A computer system may generate a copy of a file or set of related data by copying portions of the data memory representing the data to be copied to new physical data memory locations. The system then also updates the mapping tree, for example, by generating a new LUN, new inner nodes, and new leaf nodes, where the new portions of the mapping tree allow the memory controller to determine the new physical data memory locations of the copied data based on the LBA or LBAs of the copied data.

In some systems, it may be desirable to generate a clone of a parent file or set of related data. In such systems, from the perspective of the user, the clone appears to be a separate editable copy of the parent. However, within the memory, the data of the parent is not copied. Instead, the mapping tree is updated with information indicating the existence of the clone. As the clone is modified, data representing the modifications is stored, and the mapping tree is modified such that when the clone is accessed, the physical location returned is the physical location of the modified data. As compared with a copy, using a clone reduces the amount of time used for memory access, and reduces the total amount of memory used.

Figure 4:
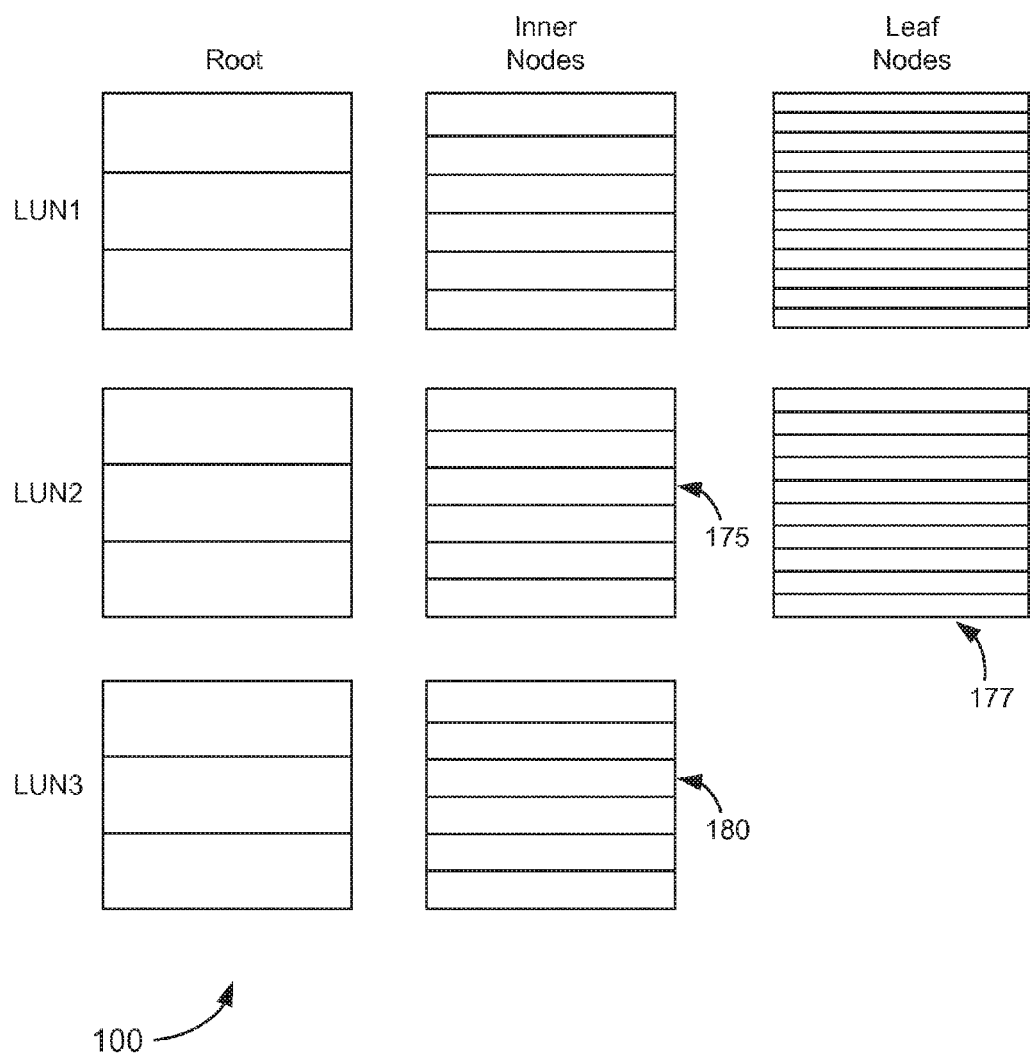
FIG. 4 is a schematic representation of an embodiment of the mapping tree, having an additional LUN, which is configured to be used to manage the data of a clone.

FIG. 4 is a schematic representation of an embodiment of the mapping tree 100, having additional LUN 3. LUN 3 is configured to be used to manage the data of a clone of the data associated with LUN 2.

In this embodiment, LUN 3 and inner nodes 180 associated with LUN 3 are generated in response to the clone being generated. For example, LUN 3 and inner nodes 180 associated with LUN 3 may be generated based on LUN 2 and inner nodes 175 of LUN 2.

For example, the inner nodes 180 of LUN 3 may be copies of the inner nodes 175 of LUN 2, with certain modifications. For example, each of the pointers in the inner nodes 180 of the copy may be replaced with an indication, such as a flag bit, representing whether or not the data of the clone corresponding with the replaced pointer has been changed or is the same as that in the parent. In addition, the header of the inner nodes 180 of the copy may be modified to replace the information indicating locations of the pointers of inner nodes 175 with information indicating the locations of the flag bits of inner nodes 180. Accordingly, the modified inner nodes 180 associated with LUN 3 may be used to determine whether each data fragment of the clone is or is not the same as the corresponding data fragment of the parent, where the determination is based on the value of a flag bit identified by information from LUN 3 and an LBA of the clone.

In addition, LUN 3 may be a copy of LUN 2, with certain modifications. For example, the pointers in the copy, which represent locations and identify the inner nodes 175 of LUN 2, may be replaced with pointers which represent locations and identify the inner nodes 180 of LUN 3. In addition, the header in the copy may be modified to replace the information indicating locations of the pointers of LUN 2 with information indicating the locations the pointers of LUN 3. Further, LUN 3 may be modified to include an indication that LUN 3 is associated with data which is a clone of LUN 2, and to include an indication identifying which clone of LUN 2 is associated with LUN 3.

With the modified mapping tree, the memory system may store data associated with the clone, and receive modifications to the clone data. If, for example, new clone data is to be inserted within previously stored parent data, the new clone data may be stored in any available physical memory location. In order to preserve the logical organization of the new clone data being within the previously stored parent data, the portions of the mapping tree associated with the clone and the parent are appropriately updated.

For example, a new leaf node in the leaf nodes 177 of LUN 2 may be generated for the new clone data. The new leaf node may include a physical address and a length of the new clone data. In addition, LUN 3 and the inner nodes 180 of LUN 3 are updated such that the hierarchy of the LUN 3 and inner nodes 180 of LUN 3 can be used to identify the new leaf node given an LBA which represents the logical location of the new clone data within the previously stored parent data.

Furthermore, if the new clone data is inserted within the file at a location which is in the middle of a parent data fragment, the leaf node representing the parent data fragment may be modified in response to the insertion of the new clone data, for example, by changing its length attribute to represent the portion of the parent data fragment before the insertion point. In addition, a second new leaf node may be generated. The second new leaf node includes the physical address location and length attributes of the portion of the parent data fragment after the insertion point. In addition, the pointers and header information of the inner nodes 180 associated with LUN 3 may be correspondingly updated, such that the inner nodes 180 of LUN 3 have pointers identifying the original leaf node, the first new leaf node, and the second new leaf node. In addition, the pointers and header information of the inner nodes 175 associated with LUN 2 may also be updated, such that the inner nodes 175 of LUN 2 have pointers identifying the original leaf node and the second new leaf node.

Figure 5:
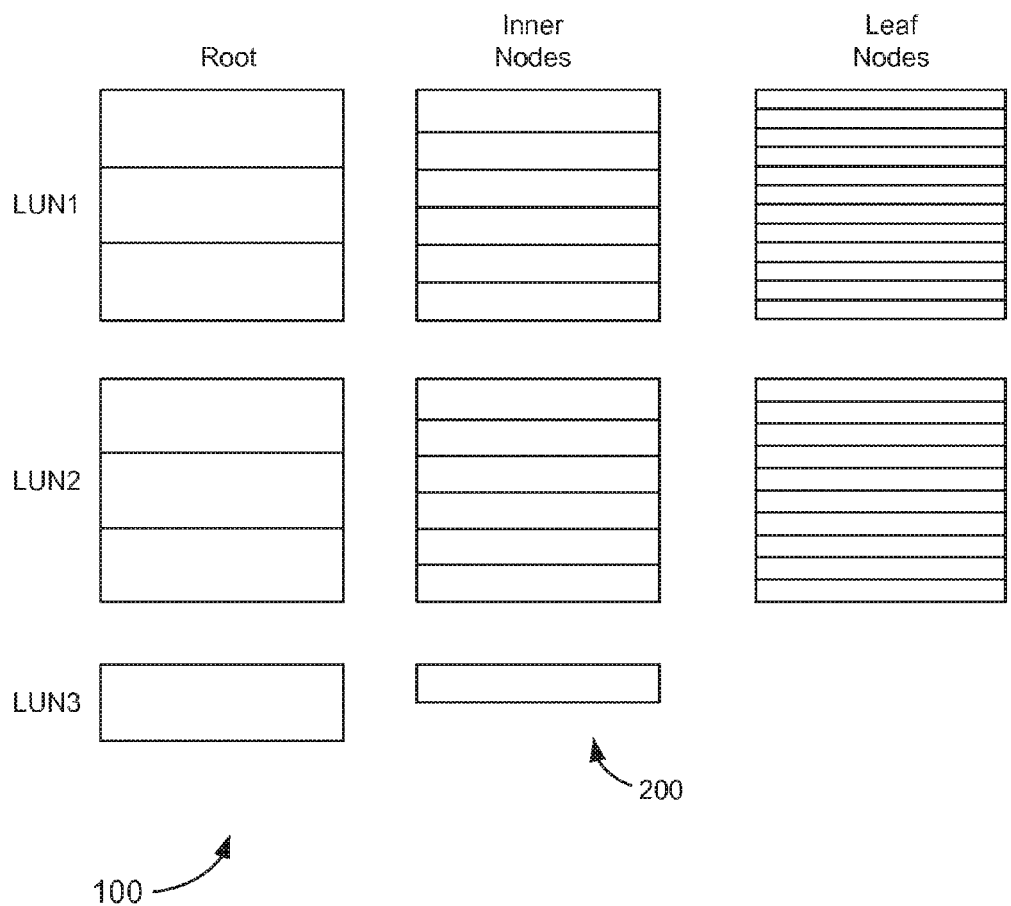
FIG. 5 is a schematic representation of an embodiment of the mapping tree, having an additional LUN, which is configured to be used to manage the data of a clone.

FIG. 5 is a schematic representation of an embodiment of the mapping tree 100, having additional LUN 3. LUN 3 is configured to be used to manage the data of a clone of the data associated with LUN 2.

In this embodiment, some portions of LUN 3 and inner nodes 200 associated with LUN 3 are not generated in response to the clone being generated, but are instead generated in response to the clone being modified. In such embodiments, some portions of LUN 3 may be generated in response to the generation of the clone, and LUN 3 and inner nodes 200 associated with LUN 3 may be modified and/or generated in response to each subsequent modification of the clone. In some embodiments, no inner nodes are generated in response to the clone being generated, but are instead generated in response to the clone being modified. In some embodiments, no LUN data is generated in response to the clone being generated, but is instead generated in response to the clone being modified.

For example, as shown in FIG. 5, after the clone has been generated the clone is modified by the user. In response to the modification, an inner node 200 is generated. The generated inner node 200 includes an indication that the clone has been modified at an LBA location associated with the modification. In addition, a portion of LUN 3 is either generated or modified so that the modification can be identified given the LBA. Accordingly, after modification, LUN 3 and the inner nodes 200 associated with LUN 3 are either generated or modified such that the hierarchy of the LUN 3 and inner nodes 200 of LUN 3 can be used to identify the modified clone data given an LBA, which represents the logical location of the modified clone data within the previously stored data.

Figure 6:
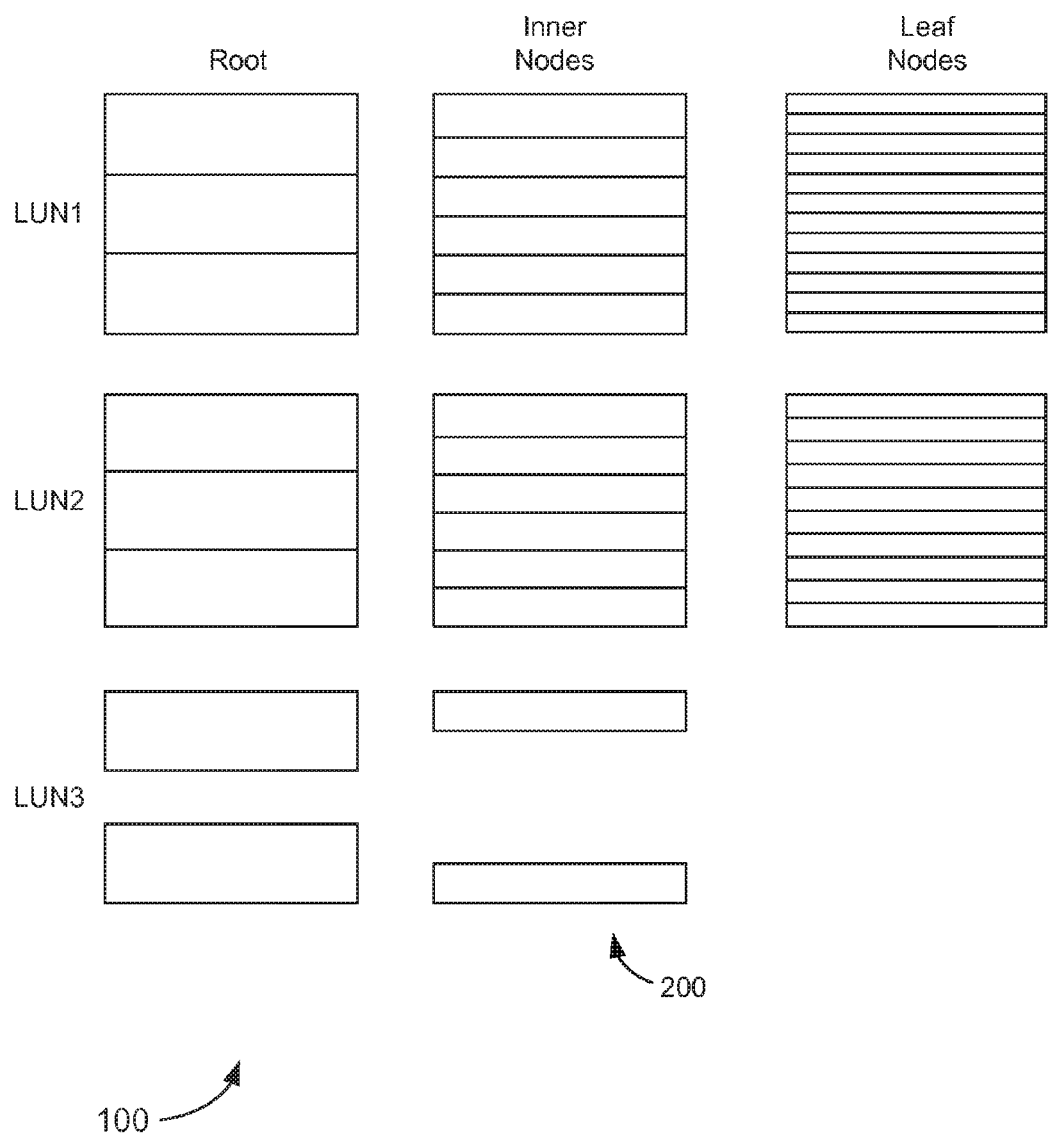
FIG. 6 is a schematic representation of an embodiment of the mapping tree, showing the additional LUN after an additional modification to the clone.

FIG. 6 is a schematic representation of an embodiment of the mapping tree 100, showing LUN 3 after an additional modification to the clone of LUN 3. As shown, portions of LUN 3 and inner nodes 200 associated with LUN 3 are generated in response to the additional clone modification. In response to the additional modification, an additional inner node 200 is generated. The additional inner node 200 includes an indication that the clone has been modified at an LBA location associated with the additional modification. Furthermore, an additional portion of LUN 3 is generated so that the additional modification can be identified given the LBA. Accordingly, in response to the additional modification, LUN 3 and the inner nodes 200 associated with LUN 3 are modified such that the hierarchy of the LUN 3 and inner nodes 200 of LUN 3 can be used to identify the additional modification to the clone data given an LBA, which represents the logical location of the additional modification within the previously stored parent data.

Figure 7:
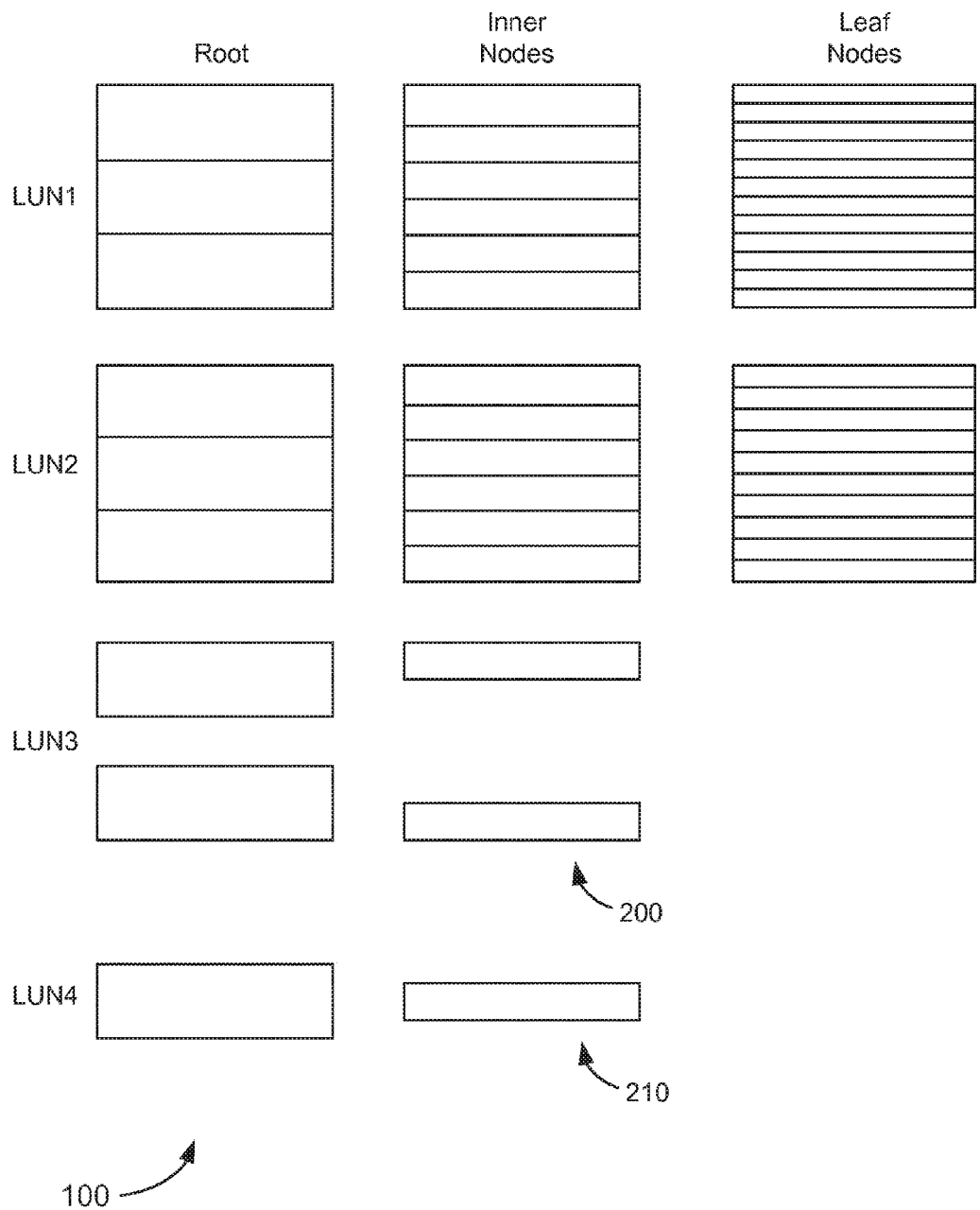
FIG. 7 is a schematic representation of an embodiment of the mapping tree, having an additional LUN, which is configured to be used to manage the data of a second clone.

FIG. 7 is a schematic representation of an embodiment of the mapping tree 100, having additional LUN 4. LUN 4 is configured to be used to manage the data of a second clone, which is a clone of the data associated with LUN 3.

In this embodiment, portions of LUN 4 and inner nodes 210 associated with LUN 4 are generated in response to the second clone being modified. In such embodiments, some portions of LUN 4 may be generated in response to the generation of the second clone, and LUN 4 and inner nodes 210 associated with LUN 4 may be modified and/or generated in response to each subsequent modification of the clone.

For example, as shown in FIG. 7, after the second clone has been generated the second clone is modified by the user. In response to the modification, an inner node 210 is generated. The generated inner node 210 includes an indication that the second clone has been modified at an LBA location associated with the modification. In addition, a portion of LUN 4 is either generated or modified so that the modification can be identified given the LBA. Accordingly, after modification, LUN 4 and the inner nodes 210 associated with LUN 4 are either generated or modified such that the hierarchy of the LUN 4 and inner nodes 210 of LUN 4 can be used to identify the modified clone data given an LBA, which represents the logical location of the modified second clone data within the previously stored data.

Figure 8:
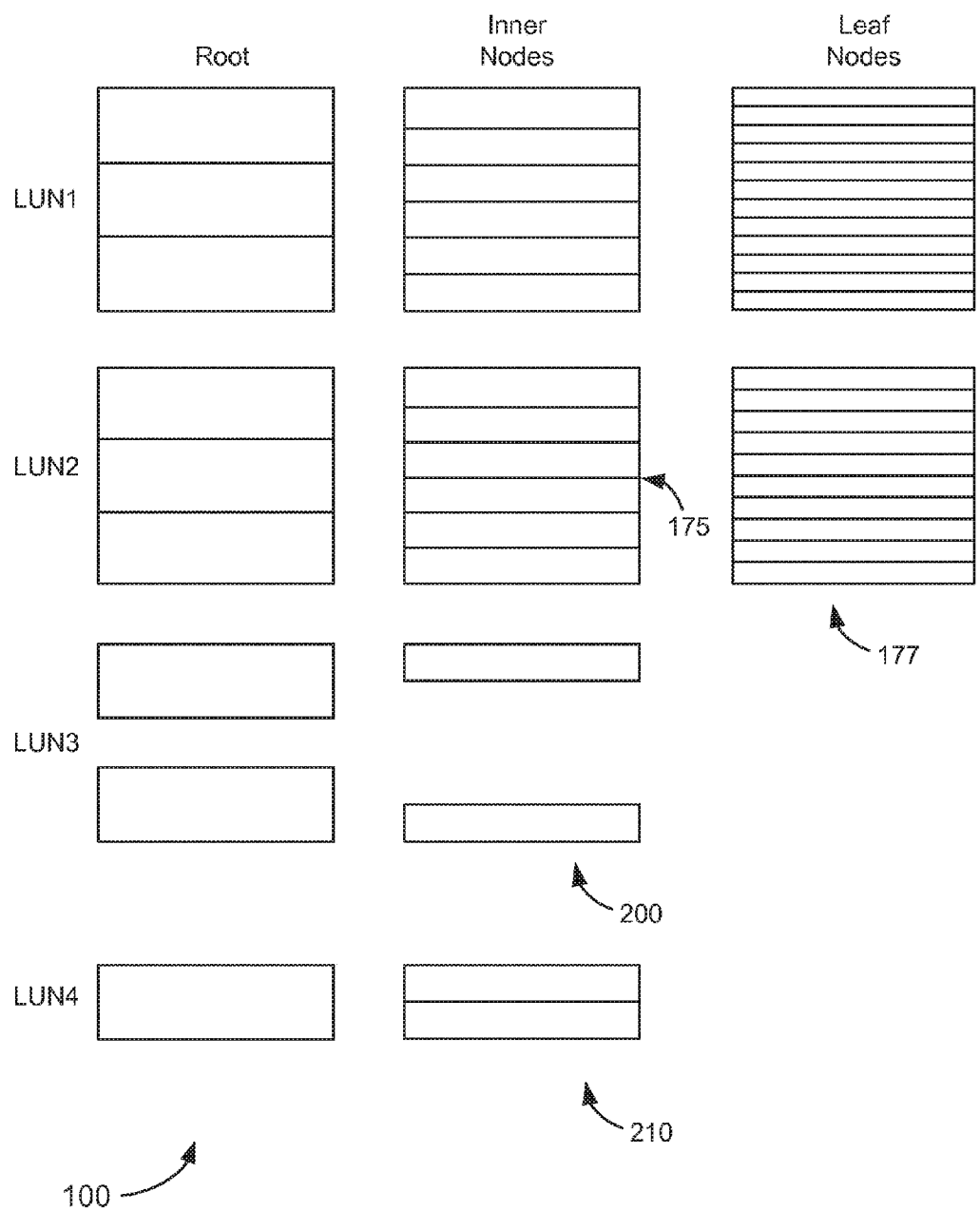
FIG. 8 is a schematic representation of an embodiment of the mapping tree, showing the additional LUN after an additional modification to the second clone.

FIG. 8 is a schematic representation of an embodiment of the mapping tree 100, showing LUN 4 after an additional modification to the clone of LUN 4. As shown, an inner node 210 associated with LUN 4 is generated in response to the additional modification to the second clone. The additional inner node 210 includes an indication that the second clone has been modified at an LBA location associated with the additional modification. In this example, a previously existing portion of LUN 4 is modified changed so that the additional modification to the second clone can be identified given the LBA. Accordingly, in response to the additional modification of the second clone, LUN 4 and the inner nodes 210 associated with LUN 4 are modified such that the hierarchy of the LUN 4 and inner nodes 210 of LUN 4 can be used to identify the additional modification to the second clone data given an LBA, which represents the logical location of the additional modification to the second clone within the previously stored parent data.

To access the data of a clone, for example, to perform a read or a copy operation, a computer having a memory system such as memory system 2 of FIG. 1 may be used.

Figure 9:
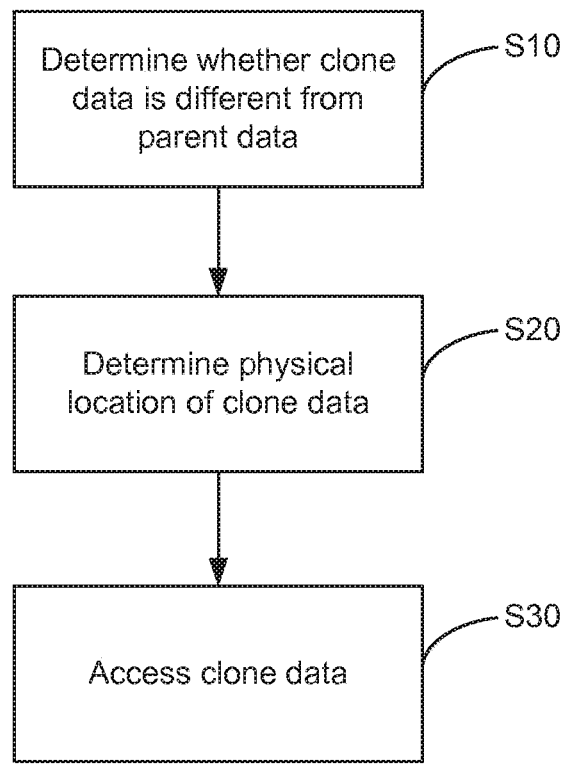
FIG. 9 is a flowchart diagram illustrating a method of accessing clone data associated with an LBA.

FIG. 9 is a flowchart diagram illustrating a method of accessing clone data associated with an LBA. For example, to access the data of the first clone of FIG. 8, which is associated with LUN 3, the memory system 2 may perform the method of FIG. 9.

At S 10, the memory controller 4 determines whether the clone data of the LBA is different from the corresponding data of the parent of the first clone. To do this, the memory controller 4 provides an instruction to mapping tree 8. The instruction may include information identifying the first clone and the LBA of the data to be accessed.

In response to the instruction, based on the identification of the first clone, the LBA, and the information stored in the inner nodes associated with LUN 3, mapping tree 8 provides an indication to the controller 4 communicating whether the data of the first clone associated with the LBA is different from data of the parent of the first clone.

For example, using the header information of LUN 3, a pointer within LUN 3 may be identified based on the LBA, where the pointer indicates one of the inner nodes 200. In addition, using the header information of the inner nodes 200, a flag bit may be identified based on the LBA, where the flag bit represents whether the data of the clone associated with the LBA has been changed or is the same as the corresponding data in the parent. The flag bit or another signal based on the flag bit maybe provided to the controller 4 to communicate whether the data of the first clone associated with the LBA is different from data of the parent of the first clone.

At S 20, the memory controller 4 determines the physical location of the data of the first clone associated with the LBA. To do this, the memory controller 4 provides an instruction to mapping tree 8. The instruction may include information identifying the first clone, the parent of the first clone, the LBA, and an indication whether the data of the first clone associated with the LBA is different from the corresponding data of the parent.

In response to the instruction, mapping tree 8 provides the physical location of the data of the first clone associated with the LBA to the memory controller 4. To do this, the hierarchy of LUN 2 and the inner nodes 175 of LUN 2 is traversed, as discussed above, to select one or more of the leaf nodes 177 based on the LBA. Using header information of the determined leaf node 177, a fragment identifier is selected based on whether the data of the first clone associated with the LBA is different from the corresponding data of the parent, and physical location information of the selected fragment identifier is provided to the memory controller 4.

For example, using the header information of LUN 2, a pointer within LUN 2 may be identified based on the LBA, where the pointer indicates one of the inner nodes 175. In addition, using the header information of the inner nodes 175, a pointer within the inner nodes 175 may be identified based on the LBA, where the pointer indicates one of the leaf nodes 177. Using header information of the indicated leaf node 177, a fragment identifier is selected based on whether the data of the first clone associated with the LBA is different from the corresponding data of the parent, and physical location information of the selected fragment identifier is provided to the memory controller 4.

If the data of the first clone associated with the LBA is different from the corresponding data of the parent of the first clone, the fragment identifier which identifies the physical memory location of the data of the first clone is selected. If the data of the first clone associated with the LBA is not different from the corresponding data of the parent of the first clone, the fragment identifier which identifies the physical memory location of the data of the parent of the first clone is selected.

At S 30, the memory controller 4 accesses the data of the first clone. To do this, the memory controller 4 provides an instruction to the data memory 6. The instruction may include the physical memory location of the data of the first clone. In response to the instruction, data memory 6 provides the data of the first clone to the memory controller 4.

Figure 10:
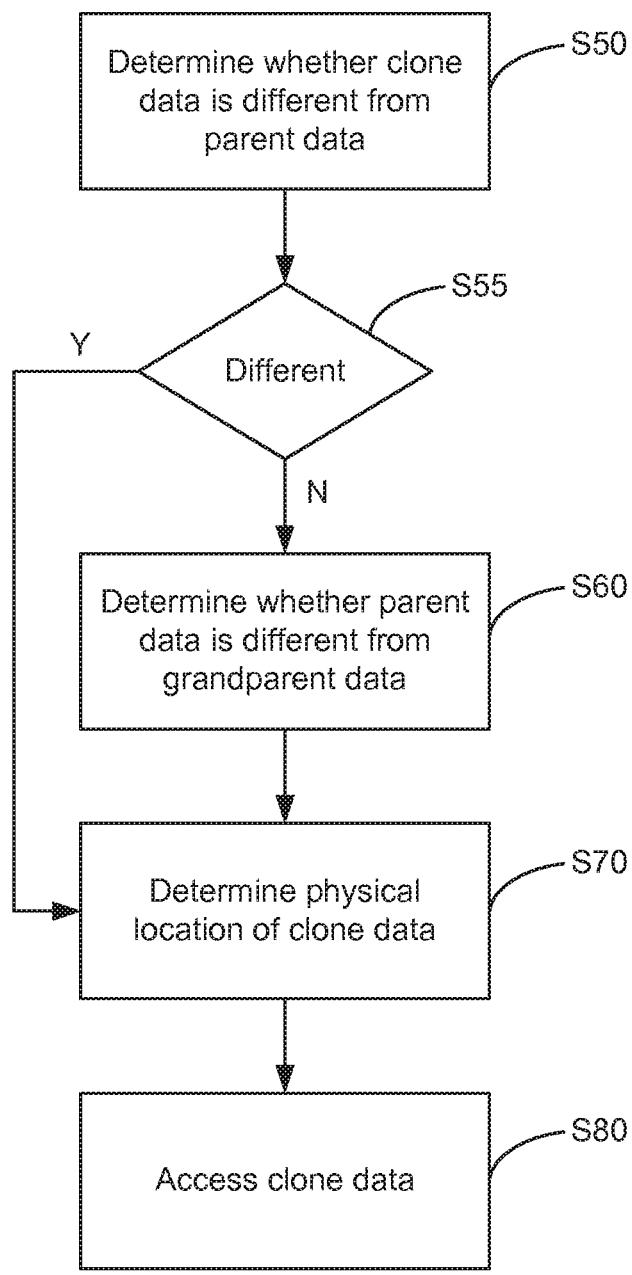
FIG. 10 is a flowchart diagram illustrating a method of accessing clone data associated with an LBA.

FIG. 10 is a flowchart diagram illustrating a method of accessing clone data associated with an LBA. For example, to access the data of the second clone of FIG. 8, which is associated with LUN 4, the memory system 2 may perform the method of FIG. 10.

At S 50, the memory controller 4 determines whether the second clone data of the LBA is different from the corresponding data of the parent of the second clone. As discussed above, the parent of the second clone is the first clone. To make the determination, the memory controller 4 provides an instruction to mapping tree 8. The instruction may include information identifying the second clone and the LBA of the data to be accessed.

In response to the instruction, based on the identification of the second clone, the LBA, and the information stored in the inner nodes 210 associated with LUN 4, mapping tree 8 provides an indication to the controller 4 communicating whether the data of the second clone associated with the LBA is different from data of the first clone, the parent of the second clone. To do this, mapping tree 8 uses a method such as that discussed above.

At S 55, the memory controller 4 determines whether the data of the second clone associated with the LBA is different from the data of the first clone. If the data of the second clone associated with the LBA is different from data of the first clone, the memory controller 4 continues to S 70, discussed below.

If the data of the second clone associated with the LBA is not different from data of the first clone, at S 60, the memory controller 4 determines whether the first clone data of the LBA is different from the corresponding data of the parent of the first clone, or grandparent of the second clone. As discussed above, the parent of the first clone is the data associated with LUN 2. To make the determination, the memory controller 4 provides an instruction to mapping tree 8. The instruction may include information identifying the first clone and the LBA of the data to be accessed.

In response to the instruction, based on the identification of the first clone, the LBA, and the information stored in the inner nodes 200 associated with LUN 3, mapping tree 8 provides an indication to the controller 4 communicating whether the data of the first clone associated with the LBA is different from data associated with LUN 3, the parent of the first clone. To do this, mapping tree 8 uses a method such as that discussed above.

At S 70, the memory controller 4 determines the physical location of the data of the second clone associated with the LBA. To do this, the memory controller 4 provides an instruction to mapping tree 8. The instruction may include the LBA and information identifying the second clone, identifying the first clone as the parent of the second clone, and identifying the data related to LUN 3 as the parent of the first clone. The instruction may also include an indication whether the data of the second clone associated with the LBA is different from the corresponding data of the first clone, and an indication whether the data of the first clone associated with the LBA is different from the corresponding data of the parent of the first clone.

In response to the instruction, mapping tree 8 provides the physical location of the data of the second clone associated with the LBA to the memory controller 4. To do this, the hierarchy of LUN 2 and the inner nodes of LUN 2 is traversed, as discussed above, to determine a leaf node based on the LBA. Using header information of the determined leaf node, a fragment identifier is selected based on whether the data of the second clone associated with the LBA is different from the corresponding data of the first clone, and whether the data of the first clone associated with the LBA is different from the corresponding data of the parent of the first clone. Physical location information of the selected fragment identifier is provided to the memory controller 4.

If the data of the second clone associated with the LBA is different from the corresponding data of the first clone, the fragment identifier which identifies the physical memory location of the data of the second clone is selected. If the data of the second clone associated with the LBA is not different from the corresponding data of the first clone, and if the data of the first clone associated with the LBA is different from the corresponding data of the parent of the first clone, the fragment identifier which identifies the physical memory location of the data of the first clone is selected. If the data of the second clone associated with the LBA is not different from the corresponding data of the first clone, and if the data of the first clone associated with the LBA is not different from the corresponding data of the parent of the first clone, the fragment identifier which identifies the physical memory location of the data of the parent of the first clone is selected.

At S 80, the memory controller 4 accesses the data of the second clone. To do this, the memory controller 4 provides an instruction to the data memory 6. The instruction may include the physical memory location of the data of the second clone. In response to the instruction, data memory 6 provides the data of the second clone to the memory controller 4.

In some embodiments, multiple sibling clones may be generated from a single parent. If data is to be retrieved for a particular one of the sibling clones, and the particular sibling clone does not have changes relative to the parent, data may be retrieved from the parent, as discussed above, or, in some embodiments, data may be algorithmically retrieved from one of the other sibling clones. For example, using methods similar to those described elsewhere herein, corresponding data may be retrieved from a sibling clone which was sequentially created adjacently prior to the particular sibling clone (a next younger sibling clone). In some embodiments, corresponding data may be retrieved from a sibling clone which was sequentially created adjacently after the particular sibling clone (a next older sibling clone). In some embodiments, corresponding data may be retrieved from a sibling clone which was most recently edited, or from a sibling clone having the corresponding data most recently edited.

Figure 11:
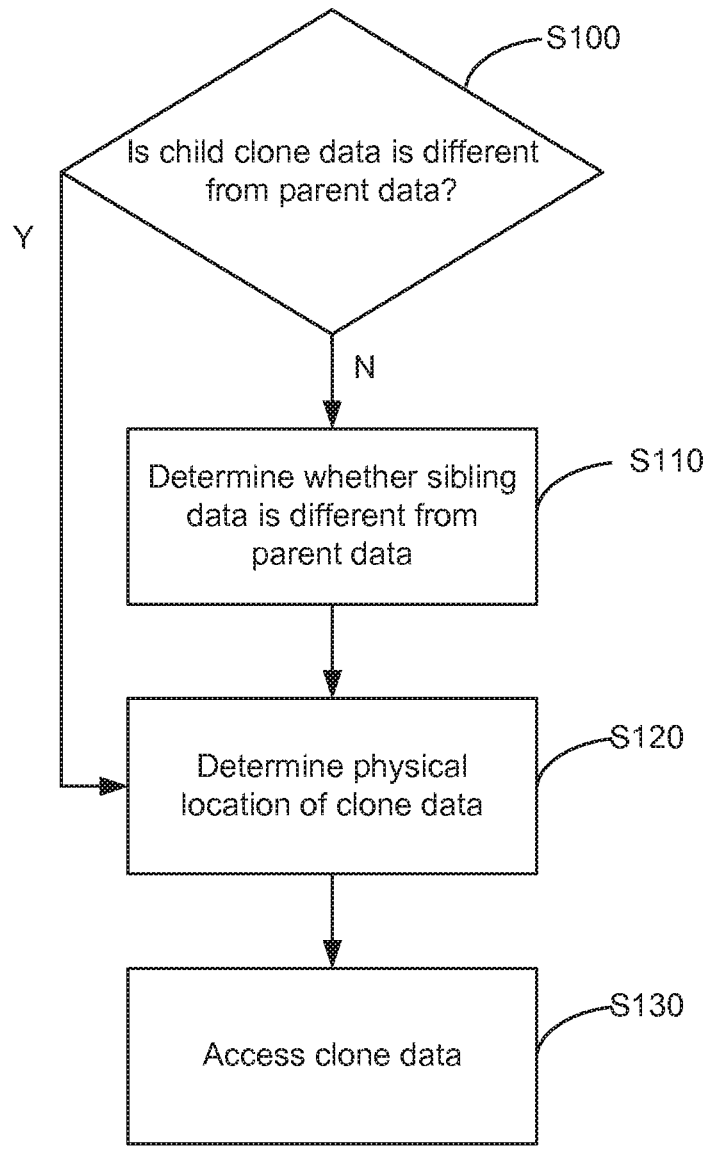
FIG. 11 is a flowchart diagram illustrating a method of accessing clone data associated with an LBA.

FIG. 11 is a flowchart diagram illustrating a method of accessing clone data associated with an LBA. For example, to access the data of a child clone having one or more siblings, the memory system 2 may perform the method of FIG. 11.

At S 100, the memory controller 4 determines whether the child clone data of the LBA is different from the corresponding data of the parent of the child clone. To make the determination, the memory system 2 performs steps similar or identical to steps described above with reference to S 50 of the method of FIG. 10.

If the data of the child clone associated with the LBA is not different from data of the first clone, at S 110, the memory controller 4 determines whether the child clone data of the LBA is different from the corresponding data of a sibling of the child clone. To make the determination, the memory system 2 performs steps similar or identical to steps described above with reference to S 60 of the method of FIG. 10.

At S 120, the memory controller 4 determines the physical location of the data of the second clone associated with the LBA. To do this, the memory system 2 performs steps similar or identical to steps described above with reference to S 70 of the method of FIG. 10.

If the data of the child clone associated with the LBA is different from the corresponding data of the parent clone, the fragment identifier which identifies the physical memory location of the data of the child clone is selected. If the data of the child clone associated with the LBA is not different from the corresponding data of the first clone, and if the data of the sibling clone associated with the LBA is different from the corresponding data of the parent clone, the fragment identifier which identifies the physical memory location of the data of the sibling clone is selected. If the data of the child clone associated with the LBA is not different from the corresponding data of the first clone, and if the data of the sibling clone associated with the LBA is not different from the corresponding data of the parent clone, the fragment identifier which identifies the physical memory location of the data of the parent clone is selected. In alternative embodiments, the memory system 2 may be configured to select other sibling clones as candidate sources for data.

At S 130, the memory controller 4 accesses the data of the child clone. To do this, the memory controller 4 provides an instruction to the data memory 6. The instruction may include the physical memory location of the data of the child clone. In response to the instruction, data memory 6 provides the data of the child clone to the memory controller 4.

In some embodiments, multiple clones are generated from a single grandparent, great grandparent, etc. In such systems, if data is to be retrieved for a particular one of the generated clones, and the particular generated clone does not have changes relative to its parent, as discussed above, in some embodiments, data may be algorithmically retrieved from one of the other generated clones.

Figure 12:
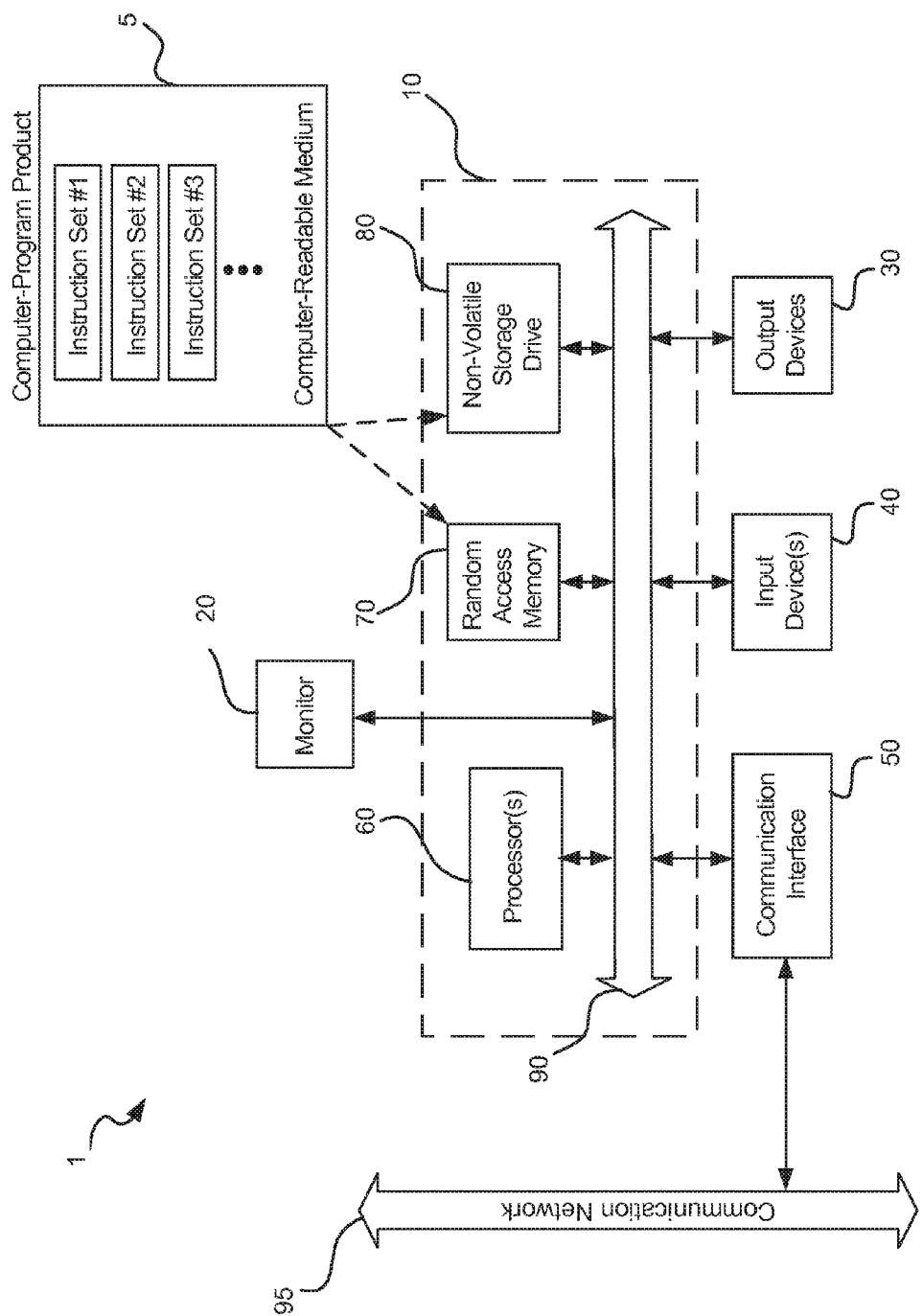
FIG. 12 is a block diagram illustrating an implementation of a computing device.

FIG. 12 is a block diagram illustrating an implementation of a computing device 1. The methods and systems described herein may be implemented by computer-program products that direct a computer system to perform the actions of the methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Device 1 comprises a computer 10, a monitor 20 coupled to computer 10, one or more additional user output devices 30 (optional) coupled to computer 10, one or more user input devices 40 (e.g., keyboard, mouse, track ball, touch screen) coupled to computer 10, an optional communications interface 50 coupled to computer 10, and a computer-program product 5 stored in a tangible computer-readable memory in computer 10. Computer-program product 5 directs device 1 to perform the methods described herein. Computer 10 may include one or more processors 60 that communicate with a number of peripheral devices via a bus subsystem 90. These peripheral devices may include user output device(s) 30, user input device(s) 40, communications interface 50, and a storage subsystem, such as random access memory (RAM) 70 and non-volatile storage drive 80 (e.g., disk drive, optical drive, solid state drive), which are forms of tangible computer-readable memory.

Computer-program product 5 may be stored in non-volatile storage drive 80 or another computer-readable medium accessible to computer 10 and loaded into memory 70. Each processor 60 may comprise a microprocessor, such as a microprocessor from Intel® or Advanced Micro Devices, Inc.®, or the like. To support computer-program product 5, the computer 10 runs an operating system that handles the communications of product 5 with the above-noted components, as well as the communications between the above-noted components in support of the computer-program product 5. Exemplary operating systems include Windows® or the like from Microsoft® Corporation, Solaris® from Oracle®, LINUX, UNLX, and the like.

User input devices 40 include all possible types of devices and mechanisms to input information to computer system 10. These may include a keyboard, a keypad, a mouse, a scanner, a digital drawing pad, a touch screen incorporated into the display, audio input devices such as voice recognition systems, microphones, and other types of input devices. In various embodiments, user input devices 40 are typically embodied as a computer mouse, a trackball, a track pad, a joystick, wireless remote, a drawing tablet, a voice command system. User input devices 40 typically allow a user to select objects, icons, text and the like that appear on the monitor 20 via a command such as a click of a button or the like. User output devices 30 include all possible types of devices and mechanisms to output information from computer 10. These may include a display (e.g., monitor 20), printers, non-visual displays such as audio output devices, etc.

Communications interface 50 provides an interface to other communication networks 95 and devices and may serve as an interface to receive data from and transmit data to other systems, WANs and/or the Internet. Embodiments of communications interface 50 typically include an Ethernet card, a modem (telephone, satellite, cable, ISDN), a (asynchronous) digital subscriber line (DSL) unit, a Fire Wire® interface, a USB® interface, a wireless network adapter, and the like. For example, communications interface 50 may be coupled to a computer network, to a Fire Wire® bus, or the like. In other embodiments, communications interface 50 may be physically integrated on the motherboard of computer 10, and/or may be a software program, or the like.

RAM 70 and non-volatile storage drive 80 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 70 and non-volatile storage drive 80 may be configured to store the basic programming and data constructs that provide the functionality of various embodiments of the present invention, as described above.

Software instruction sets that provide the functionality of the present invention may be stored in RAM 70 and non-volatile storage drive 80. These instruction sets or code may be executed by the processor(s) 60. RAM 70 and non-volatile storage drive 80 may also provide a repository to store data and data structures used in accordance with the present invention. RAM 70 and non-volatile storage drive 80 may include a number of memories including a main random access memory (RAM) to store of instructions and data during program execution and a read-only memory (ROM) in which fixed instructions are stored. RAM 70 and non-volatile storage drive 80 may include a file storage subsystem providing persistent (non-volatile) storage of program and/or data files. RAM 70 and non-volatile storage drive 80 may also include removable storage systems, such as removable flash memory.

Bus subsystem 90 provides a mechanism to allow the various components and subsystems of computer 10 communicate with each other as intended. Although bus subsystem 90 is shown schematically as a single bus, alternative embodiments of the bus subsystem may utilize multiple busses or communication paths within the computer 10.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While various embodiments of present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A memory system, comprising:
a memory controller; and
a memory, wherein the memory is configured to store a plurality of data fragments at a plurality of first physical addresses of the memory, wherein each data fragment has a logical address, and wherein the memory is further configured to store mapping tree data, wherein the mapping tree data comprises the first physical addresses, wherein the first physical addresses are stored at second physical addresses of the memory, and wherein the second physical addresses may be determined based in part on the logical addresses of the data fragments;
wherein a first portion of the mapping tree is associated with a first logically associated set of data fragments stored in the memory;
wherein a second portion of the mapping tree is associated with a second logically associated set of data fragments stored in the memory, wherein the second set of data fragments is a first clone of the first set of data fragments, and the first set of data fragments is a parent of the first clone, and wherein the second portion of the mapping tree comprises one or more first clone change indicators, each indicating that a particular data fragment of the first clone associated with a particular logical address is different from a data fragment of the parent associated with the particular logical address; and
wherein a third portion of the mapping tree is associated with a third logically associated set of data fragments stored in the memory, wherein the third set of data fragments is a second clone of the second set of data fragments, and the second set of data fragments is a parent of the second clone, and wherein the third portion of the mapping tree comprises one or more second clone change indicators, each indicating that a particular data fragment of the second clone associated with a particular logical address is different from a data fragment of the first clone associated with the particular logical address.

2. The memory system of claim 1, wherein the mapping tree data comprises a first logic unit number (LUN) associated with the parent, a second LUN associated with the first clone;
and a third LUN associated with the second clone.

3. The memory system of claim 2, wherein the first LUN comprises a plurality of first inner node pointers, pointing to a plurality of first inner nodes, and wherein the first inner nodes comprise a plurality of first leaf node pointers, pointing to a plurality of leaf nodes, and wherein the plurality of leaf nodes is configured to store the first physical addresses.

4. The memory system of claim 3, wherein the second LUN comprises a plurality of second inner node pointers, pointing to a plurality of second inner nodes, and wherein the second inner nodes comprise the first clone change indicators and wherein the third LUN comprises a plurality of third inner node pointers, pointing to a plurality of third inner nodes, and wherein the third inner nodes comprise the second clone change indicators.

5. The memory system of claim 1, wherein the memory controller is configured to determine a physical address of the data fragments based on a logical address using the mapping tree data.

6. The memory system of claim 5, wherein the memory controller is configured to determine a physical address of a particular data fragment of the second clone based on the logical address and based on a second clone change indicator associated with the particular data fragment of the second clone.

7. The memory system of claim 6, wherein the second clone change indicator associated with the particular data fragment of the second clone indicates that the particular data fragment is not different from the corresponding data fragment of the first clone, and the determined physical address of the particular data fragment of the second clone is the physical address of the corresponding data fragment of the first clone.

8. The memory system of claim 6, wherein the second clone change indicator associated with the particular data fragment of the second clone indicates that the particular data fragment is different from the corresponding data fragment of the first clone, and the determined physical address of the particular data fragment of the second clone is not a physical address of the first clone.

9. The memory system of claim 8, wherein the mapping tree data comprises a first logic unit number (LUN) associated with the parent, a second LUN associated with the first clone, and a third LUN associated with the second clone, wherein the LUN of the parent comprises a plurality of first inner node pointers, each pointing to one of a plurality of first inner nodes;
wherein the first inner nodes comprise a plurality of first leaf node pointers, pointing to a plurality of leaf nodes, and wherein the plurality of leaf nodes is configured to store the plurality of physical addresses of the data fragments of the second clone, of the first clone, and of the parent;
wherein the LUN of the first clone comprises a plurality of second inner node pointers, pointing to a plurality of second inner nodes, and wherein the second inner nodes comprise the first clone change indicators; and
wherein the LUN of the second clone comprises a plurality of third inner node pointers, pointing to a plurality of third inner nodes, and wherein the third inner nodes comprise the second clone change indicators.

10. A method of accessing data in a memory, the method comprising:

storing in the memory a plurality of data fragments at a plurality of first physical addresses of the memory, wherein each data fragment has a logical address;

storing in the memory mapping tree data, wherein the mapping tree data comprises the first physical addresses, wherein the first physical addresses are stored at second physical addresses of the memory, and wherein the second physical addresses may be determined based in part on the logical addresses of the data fragments, wherein a first portion of the mapping tree is associated with a first logically associated set of data fragments stored in the memory, and wherein a second portion of the mapping tree is associated with a second logically associated set of data fragments stored in the memory, and wherein a third portion of the mapping tree is associated with a third logically associated set of data fragments stored in the memory, wherein the second set of data fragments is a first clone of the first set of data fragments, and the first set of data fragments is a parent of the first clone, and wherein the second portion of the mapping tree comprises one or more first clone change indicators, each indicating that a particular data fragment of the first clone associated with a particular logical address is different from a data fragment of the parent associated with the particular logical address, and wherein the data to be accessed is a member of the second set of data fragments and is associated with a particular logical address, wherein the third set of data fragments is a second clone of the second set of data fragments, and the second set of data fragments is a parent of the second clone, and wherein the third portion of the mapping tree comprises one or more second node change indicators, each indicating that a particular data fragment of the second clone associated with a particular logical address is different from a data fragment of the first clone associated with the particular logical address, and wherein the data to be accessed is a member of the third set of data fragments and is associated with a particular logical address;

determining whether the data to be accessed is different from a data fragment of the first clone associated with the particular logical address based on an indicator associated with the data to be accessed;

determining a physical location of the data to be accessed based on whether the data to be accessed is different from a corresponding data fragment of the first clone associated with the particular logical address; and accessing the data to be accessed based on the physical location.

11. The method of claim 10, further comprising in response to the data to be accessed not being different from the data fragment of the first clone associated with the particular logical address, determining whether data of a sibling clone of the clone corresponding with the logical address is different from a data fragment of the first clone associated with the particular logical address based on an indicator associated with the data of the sibling clone.

12. The method of claim 10, wherein the mapping tree data comprises a first logic unit number (LUN) associated with the parent, a second LUN associated with the first clone, and a third LUN associated with the second clone, wherein the LUN of the parent comprises a plurality of first inner node pointers, each pointing to one of a plurality of first inner nodes, and wherein the first inner nodes comprise a plurality of first leaf node pointers, pointing to a plurality of leaf nodes, and wherein the plurality of leaf nodes is configured to store the plurality of physical addresses of the data fragments of the clone and of the parent;

wherein the LUN of the first clone comprises a plurality of second inner node pointers, pointing to a plurality of second inner nodes, and wherein the second inner nodes comprise the first clone change indicators;

wherein the LUN of the second clone comprises a plurality of third inner node pointers, pointing to a plurality of third inner nodes, and wherein the third inner nodes comprise the second clone change indicators; and wherein determining whether the data to be accessed is different from the corresponding data fragment of the first clone comprises:

selecting a second inner node associated with the data to be accessed based on the logical address and the third inner node pointers of the LUN of the second clone; and selecting a second clone change indicator associated with the data to be accessed based on the logical address, wherein the selected change indicator is stored in the selected third inner node.

13. The method of claim 12, determining the physical location of the data to be accessed comprises:

selecting a second inner node associated with the data to be accessed based on the logical address and the second inner node pointers of the LUN of the first clone; and selecting a leaf node associated with the data to be accessed based on the logical address and based on a leaf node pointer of the selected second inner node, wherein the selected leaf node comprises the physical location of the data to be accessed.

14. The method of claim 13, wherein the selected change indicator indicates that the data to be accessed is not different from the corresponding data fragment of the first clone, and wherein the selected leaf node comprises the physical address of the corresponding data fragment of the first clone.

15. The method of claim 13, wherein the selected change indicator indicates that the data to be accessed is different from the corresponding data fragment of the first node, and wherein the selected leaf node comprises the physical address of the data to be accessed, wherein the physical address of the data to be accessed is different from the physical address of the corresponding data fragment of the first clone.

16. A method of changing data of a clone in a memory, the method comprising:

storing in the memory a plurality of data fragments at a plurality of first physical addresses of the memory, wherein each data fragment has a logical address;

storing in the memory a mapping tree data, wherein the mapping tree data comprises the first physical addresses, wherein the first physical addresses are stored at second physical addresses of the memory, and wherein the second physical addresses may be determined based in part on the logical addresses of the data fragments, wherein a first portion of the mapping tree is associated with a first logically associated set of data fragments stored in the memory, wherein a second portion of the mapping tree is associated with a second logically associated set of data fragments stored in the memory, wherein the second set of data fragments is a first clone of the first set of data fragments, wherein a third portion of the mapping tree is associated with a third logically associated set of data fragments stored in the memory, wherein the third set of data fragments is a second clone of the second set of data fragments, and the first set of data fragments is a parent of the first clone, wherein the second portion of the mapping tree comprises a plurality of first clone change indicators associated with a plurality of logical addresses, wherein the first clone change indicators indicate whether the data fragment of the first clone is different from corresponding data fragments of the parent, wherein the third portion of the mapping tree comprises a plurality of second clone change indicators associated with a plurality of logical addresses, wherein the second clone change indicators indicate whether the data fragment of the second clone is different from corresponding data fragments of the first clone, and wherein the data to be changed is a member of the third set of data fragments and is associated with a particular logical address;

changing the data to be changed; and generating a change indicator associated with the particular logical address, wherein the generated change indicator indicates that the data to be changed has been changed, and wherein the generated change indicator is associated with the particular logical address.

17. The method of claim 16, wherein the mapping tree data comprises a first logic unit number (LUN) associated with the parent, a second LUN associated with the first clone, and a third LUN associated with the second clone, wherein the LUN of the parent comprises a plurality of first inner node pointers, each pointing to one of a plurality of first inner nodes, and wherein the first inner nodes comprise a plurality of first leaf node pointers, pointing to a plurality of leaf nodes, and wherein the plurality of leaf nodes is configured to store the plurality of physical addresses of the data fragments of the second clone, of the first clone, and of the parent, wherein the LUN of the firsts clone comprises a plurality of second inner node pointers, pointing to a plurality of second inner nodes, and wherein the second inner nodes comprise the first clone change indicators, wherein the LUN of the second clone comprises a plurality of third inner node pointers, pointing to a plurality of third inner nodes, and wherein the third inner nodes comprise the second clone change indicators, and wherein generating the second clone change indicator associated with the data to be changed comprises:

generating an additional third inner node; and associating the additional third inner node with the logical address of the changed data; and storing the generated change indicator in the additional third inner node.

18. The method of claim 17, further comprising:

generating an additional leaf node, the additional leaf node storing a physical address of the changed data; and associating the additional leaf node with the logical address of the changed data.

19. The method of claim 18, further comprising generating an additional third inner node pointer in the LUN of the second clone, wherein the additional third inner node pointer points to the additional third inner node.

20. The method of claim 19, further comprising:

generating an additional second inner node; and associating the additional second inner node with the logical address of the changed data.

21. The method of claim 20, further comprising generating an additional second inner node pointer in the LUN of the first clone, wherein the additional second inner node pointer points to the additional second inner node.

* * * * *